United States Patent
Kline et al.

(10) Patent No.: US 11,161,967 B2
(45) Date of Patent: Nov. 2, 2021

(54) POLYMER POWDER AND OBJECT MADE FROM THE SAME

(71) Applicant: Hexcel Corporation, Stamford, CT (US)

(72) Inventors: Whitney Kline, Ellington, CT (US); Lawrence Varholak, Southbury, CT (US)

(73) Assignee: Hexcel Corporation, Stamford, CT (US)

( * ) Notice: Subject to any disclaimer, the term of this patent is extended or adjusted under 35 U.S.C. 154(b) by 174 days.

(21) Appl. No.: 16/778,721

(22) Filed: Jan. 31, 2020

(65) Prior Publication Data

US 2020/0165417 A1 May 28, 2020

Related U.S. Application Data

(62) Division of application No. 16/134,385, filed on Sep. 18, 2018, now Pat. No. 10,619,032.

(51) Int. Cl.
| | | |
|---|---|---|
| *C08K 7/06* | (2006.01) | |
| *B33Y 70/00* | (2020.01) | |
| *B29B 9/02* | (2006.01) | |
| *B33Y 30/00* | (2015.01) | |

(52) U.S. Cl.
CPC .............. *C08K 7/06* (2013.01); *B29B 9/02* (2013.01); *B33Y 70/00* (2014.12); *B33Y 30/00* (2014.12)

(58) Field of Classification Search
CPC .............. C08K 7/06; B33Y 70/00; B29B 9/02
See application file for complete search history.

(56) References Cited

U.S. PATENT DOCUMENTS

| | | |
|---|---|---|
| 3,065,205 A | 11/1962 | Bonner, Jr. et al. |
| 3,441,538 A | 4/1969 | Marks et al. |
| 3,442,857 A | 5/1969 | Thornton et al. |
| 3,516,966 A | 6/1970 | Berr et al. |
| 4,704,448 A | 11/1987 | Brugel |
| 4,816,556 A | 3/1989 | Gay et al. |
| 6,177,518 B1 | 1/2001 | Lahijani |
| 8,313,087 B2 | 11/2012 | Hesse et al. |
| 8,795,833 B2 | 8/2014 | Dallner et al. |
| 2006/0134419 A1 | 6/2006 | Monsheimer et al. |
| 2008/0156148 A1 | 7/2008 | Smith et al. |
| 2015/0061195 A1 | 3/2015 | DeFelice et al. |
| 2015/0328665 A1 | 11/2015 | DeFelice et al. |
| 2017/0028632 A1 | 2/2017 | Cox et al. |
| 2018/0009982 A1 | 1/2018 | Steele et al. |
| 2018/0200922 A1 | 7/2018 | DeFelice et al. |
| 2018/0200960 A1 | 7/2018 | DeFelice et al. |
| 2018/0201783 A1 | 7/2018 | DeFelice et al. |

FOREIGN PATENT DOCUMENTS

WO 2014100320 A1 6/2014

OTHER PUBLICATIONS

International Search Report and Written Opinion of the International Searching Authority Application No. PCT/US2019/051489 Completed: Oct. 25, 2019; dated Nov. 14, 2019 10 Pages.
Cheng, Z. D. et al.; "Polymorphism and crystal structure identification in poly(aryl ether ketone ketone)s," Macromol. Chem. Phys. 197, 185-213 (1996) Abstract.
U.S. Office Action U.S. Appl. No. 16/134,385 dated Jul. 2, 2019 7 Pages.

*Primary Examiner* — Edward J Cain
(74) *Attorney, Agent, or Firm* — Welsh IP Law LLC

(57) ABSTRACT

A powder composition suitable for use in selective laser sintering for printing an object. The powder composition includes a first fraction including a plurality of polyaryletherketone (PAEK) particles having a mean diameter less than 30 microns, a second fraction having a plurality of polyaryletherketone (PAEK) particles having a mean diameter greater than 30 microns, and a third fraction having a plurality of carbon fibers. The first fraction and the second fraction are formed by an air classification separation performed on a pulverized powder. After the separation, the first fraction, the second fraction, and the third fraction are blended in a high intensity mixer. The powder composition when used in selective laser sinter results in parts with increased tensile strength and reduced surface roughness, among other improvements, as compared to similar powders omitting the first fraction. The PAEK may include polyetherketoneketone (PEKK).

26 Claims, 12 Drawing Sheets

| Lot Number | Glass Transition Temp. ($T_g$, °C) | Melting Transition Temp. ($T_m$, °C) | Heat of Fusion (HOF, J/g) | FTIR (% match to a standard) |
|---|---|---|---|---|
| X5470S-6013M | 161 | 267, 302 | 38.79 | 98.73 |
| X0000S-6170M | 161 | 268, 302 | 41.46 | 96.35 |
| X6180S-6388M | 157 | 270, 294 | 45.39 | 97.20 |
| X6180S-6484M | 161 | 270, 296 | 43.95 | 97.25 |
| X0000S-6483MA* | 157 | 297 | 34.24 | 97.20 |
| X0000S-7000MA* | 157 | 294 | 40.91 | 97.59 |
| X6896S-300348M | 158 | 268, 294 | 42.76 | 96.74 |
| X7329S-301055M | 161 | 267, 302 | 42.60 | 96.74 |
| X301410S-301598M | 161 | 269, 300 | 42.69 | 95.77 |
| 03M0000126 | 161 | 268, 301 | 41.05 | 96.04 |
| Acceptance Criteria | 152 - 165 | N/A | N/A | ≥ 95 |

600

| Part # (powder) | Supplier | Condition | Compound/Blend Job | Lot # | % Fines (total PEKK) | Build Job# | P800 |
|---|---|---|---|---|---|---|---|
| RD16017 | Arkema | Type I | 6013 | X5470S-6013M | 22.3% | 6113 | N01 |
| RD16017 | Arkema | Type I | 6170 | X0000S-6170M | 24% | 6224 6298 | N01 N02 |
| RD16027 | Cytec | Type I | 6388 | X6180S-6388M | 20.9% | 6407 | N06 |
| RD16027 | Cytec | Type I | 6484 | X6180S-6484M | 20.9% | 6573 | N05 |
| RD16018 | Arkema | Type II | 6483 | X0000S-6483MA | Blend | 6574 | N03 |
| RD16028 | Cytec | Type II | 7000 | X0000S-7000MA | Blend | 7004 | N06 |
| RD17030 | Cytec | Type I | 300348 | X6896S-300348M | 20% | 300393 300532 300879 | N04 |
| RD17041 | Arkema | Type I | 301055 | X7329S-301055M | 20% | 301070 301076 301078 301209 301580 301609 301619 301665 | N04 N04 N03 N07 N02 N04 N04 N04 |
| RD18003 | Arkema | Type I | 301598 | X301410S-301598M | 15% | 301638 301724 301739 301791 | N05 N05 N03 N05 |
| RD18006 | Arkema | Type I | 03M0000126 | 03M0000126 | 10% | 03M0000407 03M0000521 03M0000552 | N03 N02 N02 |

| Job Number | Process Chamber Temperature (°C) | Max Dosing Factor (%) | Min Dosing Factor (%) | Exposure [ESDCON_] |
|---|---|---|---|---|
| 6113 | 280 | 250 | 100 | 8 |
| 6224 | 280 | 250 | 100 | 8 |
| 6298 | 280 | 250 | 100 | 8 |
| 6407 | 280 | 250 | 100 | 5 |
| 6573 | 280 | 250 | 100 | 6 |
| 6574 | 299 | 255 | 100 | 15 |
| 7004 | 299 | 250 | 100 | 20 |
| 300393 | 280 | 250 | 100 | 6 |
| 300532 | 280 | 250 | 100 | 6 |
| 300879 | 280 | 250 | 100 | 6 |
| 301070 | 275 | 250 | 100 | 7 |
| 301076 | 275 | 250 | 100 | 7 |
| 301078 | 275 | 250 | 100 | 7 |
| 301209 | 275 | 250 | 100 | 7 |
| 301580 | 275 | 250 | 100 | 7 |
| 301609 | 275 | 250 | 100 | 7 |
| 301619 | 275 | 250 | 100 | 7 |
| 301638 | 275 | 250 | 100 | 10 |
| 301665 | 275 | 250 | 100 | 7 |
| 301724 | 275 | 250 | 100 | 10 |
| 301739 | 275 | 250 | 100 | 10 |
| 301791 | 275 | 250 | 100 | 10 |
| 03M0000407 | 274 | 250 | 100 | 9 |
| 03M0000521 | 274 | 250 | 100 | 9 |
| 03M0000552 | 274 | 250 | 100 | 9 |

| Job Number | Glass Transition Temp., $T_g$ [°C] | FTIR [% match] | Specific Gravity | X Average Tensile Break [psi] | X Average Tensile Elongation [%] | X Average Modulus [kpsi] | Z Average Tensile Break [psi] | Z Average Tensile Elongation [%] | Z Average Modulus [kpsi] |
|---|---|---|---|---|---|---|---|---|---|
| 6113 | 161 | 98.29 | 1.32 | 16300 | 2.6 | 882 | 10300 | 1.9 | 503 |
| 6224 | 161 | 98.54 | 1.31 | 18100 | 2.4 | 903 | 10400 | 1.7 | 669 |
| 6298 | 161 | 97.44 | 1.31 | 16100 | 2.6 | 883 | 9430 | 1.5 | 687 |
| 6407 | 157 | 97.10 | 1.34 | 19200 | 2.3 | 1170 | 10500 | 1.4 | 812 |
| 6573 | 158 | 98.27 | 1.31 | 18200 | 2.3 | 1060 | 9940 | 1.5 | 742 |
| 6574 | 161 | 96.63 | 1.33 | 16000 | 2.2 | 966 | 11200 | 1.7 | 733 |
| 7004 | 158 | 98.03 | 1.33 | 15500 | 1.7 | 1180 | 9870 | 1.3 | 889 |
| 300393 | 159 | 96.96 | 1.33 | 17900 | 2.2 | 1030 | 10900 | 1.6 | 759 |
| 300532 | 159 | 96.92 | 1.32 | 18000 | 2.2 | 1060 | 8400 | 1.1 | 767 |
| 300879 | 159 | 96.76 | 1.32 | 15900 | 2.2 | 861 | 11100 | 1.7 | 724 |
| 301070 | 162 | 97.3 | 1.31 | 16800 | 2.6 | 911 | 11000 | 1.8 | 683 |
| 301076 | 162 | 96.18 | 1.31 | 16000 | 2.2 | 953 | 9240 | 1.4 | 746 |
| 301078 | 162 | 97.97 | 1.31 | 17100 | 2.4 | 934 | 8800 | 1.3 | 728 |
| 301209 | 162 | 97.93 | 1.30 | 17300 | 2.6 | 906 | 8930 | 1.5 | 666 |
| 301380 | 162 | 98.55 | 1.31 | 16400 | 2.2 | 1010 | 7100 | 1.1 | 698 |
| 301609 | 161 | 97.79 | 1.31 | 18200 | 2.2 | 942 | 10200 | 1.6 | 710 |
| 301619 | 162 | 97.43 | 1.31 | 16100 | 2.3 | 963 | 9620 | 1.5 | 708 |
| 301638 | 161 | 98.24 | 1.31 | 17100 | 2.3 | 938 | 10500 | 1.6 | 722 |
| 301665 | 162 | 97.21 | 1.30 | 16100 | 2.4 | 878 | 9230 | 1.4 | 712 |
| 301724 | 162 | 98.05 | 1.32 | 17200 | 2.3 | 1000 | 9080 | 1.4 | 711 |
| 301739 | 162 | 97.84 | 1.32 | 16000 | 2.0 | 973 | 8440 | 1.2 | 731 |
| 301791 | 161 | 97.87 | 1.31 | 17400 | 2.5 | 952 | 9820 | 1.5 | 731 |
| 03M0000407 | 162 | 97.72 | 1.32 | 15276 | 2.4 | 875 | 8642 | 1.4 | 727 |
| 03M0000521 | 162 | 97.28 | 1.32 | 16700 | 2.5 | 905 | 10100 | 1.5 | 738 |
| 03M0000552 | 162 | 97.25 | 1.32 | 15747 | 2.4 | 906 | 9743 | 1.6 | 757 |
| Fines Average | 161 | 97.58 | 1.32 | 16673 | 2.3 | 963 | 9699 | 1.5 | 722 |
| Non-Fines Avg | 161 | 97.45 | 1.30 | 15500 | 2.3 | 920 | 8750 | 1.4 | 703 |
| Acceptance Criteria | 152-165 | ≥95.00 | 1.30-1.36 | ≥6000 | N/A | ≥410 | ≥6000 | N/A | ≥410 |

FIG. 8    800

| % Fines (total PEKK) | X Average Tensile Break [psi] | X Average Tensile Elongation [%] | X Average Modulus [kpsi] | Z Average Tensile Break [psi] | Z Average Tensile Elongation [%] | Z Average Modulus [kpsi] |
|---|---|---|---|---|---|---|
| 0% | 15500 | 2.3 | 920 | 8750 | 1.4 | 703 |
| 20% | 16557 | 2.4 | 949 | 9270 | 1.5 | 706 |
| 15% | 16760 | 2.3 | 952 | 9414 | 1.4 | 721 |
| 10% | 15907 | 2.4 | 895 | 9495 | 1.5 | 741 |

POLYMER POWDER AND OBJECT MADE FROM THE SAME

TECHNICAL FIELD

The present disclosure generally relates to additive manufacturing technology and techniques, and more specifically relates to a polyether ether ketone ("PEKK") powder composition for use in selective laser sintering ("SLS" or "LS"), a method for preparing the powder composition, and a method for additively manufacturing an object using the PEKK powder composition such that the useful yield of the powder composition is increased.

BACKGROUND

It is known to use additive manufacturing technology and techniques, together with polymer powders, to manufacture high-performance products having applications in various industries (e.g., aerospace, industrial, medical, etc.).

SLS is an additive manufacturing technique that uses a laser to fuse small particles of plastic, metal (direct metal laser sintering), ceramic, or glass powders into a mass having a desired three-dimensional (3-D) shape. The laser selectively fuses the powder material by scanning cross-sectional layers generated from a 3-D digital description of the desired object onto the top layer of a bed of the powder material. After a cross-sectional layer is scanned, the powder bed is lowered by one-layer thickness in a z-axis direction, a new top layer of powder material is applied to the powder bed, and the powder bed is rescanned. This process is repeated until the object is completed. When completed, the object is formed in a "cake" of unfused powder material. The formed object is extracted from the cake. The powder material from the cake can be recovered, sieved, and used in a subsequent SLS process.

Polyaryletherketones ("PAEK") are of interest in the SLS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKEKK").

PEKK powders are of particular interest in the SLS process because objects that have been manufactured from PEKK powders via SLS have demonstrated not only the above characterizations but also superior strength relative to other PAEK materials. Furthermore, PEKK powders are unique in the SLS technique because unused PEKK powder can be recycled in subsequent SLS processes and the resultant pieces exhibit increased strength as compared to similar parts made with virgin powder.

In order to prepare the PEKK powder, raw PEKK is milled to form a PEKK powder. The grinding step can be performed using known grinding techniques, for example jet milling, by companies such as Aveka, Inc. of Woodbury, Minn., USA. Upon completion of the grinding step, the powder particles typically range in size from 8 µm to 160 µm, as determined by post-milling measurement.

A disadvantage of performing SLS on powder compositions with PEKK is that it is not possible to build objects when fine particles are included in the feedstock. Fine particles, typically described in this context, have a diameter of 30 µm or less and are sometimes referred to as fines. It is not possible to use the fines in SLS because they inhibit the application of powder in the SLS machine. For example, the fines may cause pilling, sticking, and other forms of fouling in steps of the SLS process in which smooth flowing powder are required. Therefore, it is understood that it is not possible to operate the SLS machine to build parts using milled powder that includes fine particles.

It is known to overcome the aforementioned disadvantages associated with milled SLS feedstocks by removing the fines from the feedstock prior to use in the SLS procedure. The removal of fine particles can be achieved by identifying a cut off size, for example 30 µm, and sieving particles below this identified value from the milled feedstock via an air classification or other method so as to remove the problematic particles from the lot.

US Publication No. 2015/0328665 to Hexcel Inc. for a Method for Preparing Fine Powders for Use in Selective Laser Sintering Processes acknowledges that fine powders cannot be used in the SLS process and further discloses the methods of eliminating fines from the feedstocks prior to performing SLS.

US Publication No. 2006/0134419 to Monsheimer et al. for Use of Polyarylene Ether Ketone Powder in a Three-Dimensional Powder-Based Moldless Production Process, and Moldings Produced is directed to a powder containing a porous PAEK whose BET surface area is from 1 to 60 m$^2$/g in the SLS process. Monsheimer teaches that for better processability in a rapid prototyping or rapid manufacturing system, the fraction of particles smaller than 30 µm should eliminated from the milled particle feedstock via sifting. U.S. Pat. No. 8,795,833 to Dallner et al for Polyoxymethylene Laser Sintering Powder, Process for Its Production, and Moldings Produced from This Laser Sintering Powder teaches that particles with size smaller than 30 µm (fines) are removed from the ground product prior to SLS. US Publication No. 2017/0028632 to Cox for Powder Bed Fusing Thermoplastic Polymers explains that fines that are generated during the milling process cannot be used in SLS. US Publication No. 2018/0009982 to Steel for compounded copolyimide powders for use in SLS teaches removal of the fines fractions for improved flowability in the SLS process.

Another disadvantage resulting from the need to remove fine particles from the polymer feedstock prior to SLS is that it significantly increases the cost of performing SLS because there is no commercial demand for the fine particles separated from the feedstock during the sieving process and therefore they are considered waste. The removal of fine particles prior to SLS reduces the yield of materiel generated during the milling process, sometimes by up to 33%, and thus increases the cost of parts made via SLS.

SUMMARY

The needs set forth herein as well as further and other needs and advantages are addressed by the present teachings, which illustrate solutions and advantages described below.

It is an objective of the present teachings to remedy the above drawbacks and issues associated with prior art selective laser sintering methods.

The present invention resides in one aspect in a powder composition suitable for use in laser sintering for printing a three-dimensional object. The powder composition includes a first fraction comprising a polyaryletherketone (PAEK) powder having a plurality of particles, the plurality of particles having a mean diameter less than 30 micron. The powder composition includes a second fraction comprising a PAEK powder having a plurality of particles, the plurality of particles having a mean diameter greater than 30 microns. The powder composition includes a third fraction comprising a plurality of carbon fibers.

In yet a further embodiment of the present invention the first fraction and the second fraction comprise polyetherketoneketone (PEKK) particles.

In yet a further embodiment of the present invention the plurality of particles of the first fraction have a mean diameter between 10 μm to 20 μm.

In yet a further embodiment of the present invention the third fraction is between 10% and 20% of the composition by weight.

In yet a further embodiment of the present invention the first fraction is between 10% and 20% of the composition by weight.

In yet a further embodiment the first fraction is 17% or less of the composition by weight. In some embodiments, the first fraction is 10% or less of the composition by weight, and in yet further embodiments the first fraction is 8.5% of the composition by weight.

In yet a further embodiment of the present invention, the third fraction is 15% of the composition by weight.

In yet a further embodiment of the present invention the first fraction is 15% of the composition by weight.

In yet a further embodiment of the present invention the PEKK particles are substantially non-spherical.

In yet a further embodiment of the present invention a mean length of the plurality of carbon fibers is greater than a mean diameter of the plurality of particles of the powder composition.

The present invention resides in one aspect in a method of preparing a powder composition suitable for use in laser sintering for printing a three-dimensional object. The method includes the step of providing a polyaryletherketone (PAEK) powder material comprising a plurality of particles. The method further includes the step of separating the plurality of particles based on a particle diameter to form a first fraction and a second fraction. The first fraction has a plurality of particles having a mean diameter less than 30 micron. The second fraction has a plurality of particles having a mean diameter greater than 30 microns. The method next includes the step of mixing the first fraction with the second fraction with a plurality of carbon fibers to obtain the powder composition suitable for use in selective laser sintering.

In yet a further embodiment of the present invention the step of providing PAEK powder comprises the step of providing a plurality of polyetherketoneketone (PEKK) particles.

In yet a further embodiment of the present invention the plurality of particles of the first fraction resulting from the step of separating have a mean diameter between 10 μm to 20 μm.

In yet a further embodiment of the present invention the third fraction is between 10% and 20% of the composition by weight resulting from the step of mixing.

In yet a further embodiment of the present invention the first fraction is between 10% and 20% of the composition by weight resulting from the step of mixing.

In yet a further embodiment of the present invention the third fraction is 15% of the composition by weight.

In yet a further embodiment of the present invention the first fraction is 15% of the composition by weight.

In yet a further embodiment of the present invention the method includes the step of grinding a PEKK stock to form the PEKK particles, the PEKK particles being substantially non-spherical.

In yet a further embodiment of the present invention, the step mixing comprises mixing the first fraction, the second fraction, and the third fraction in a high intensity mixer.

In yet a further embodiment of the present invention the step of mixing comprises operating the high intensity mixer at a speed of greater than 500 rpm for at least one minute.

In yet a further embodiment of the present invention, the method includes the step of heat treating the PEKK stock before the grinding step to evaporate impurities.

BRIEF DESCRIPTION OF THE DRAWINGS

FIG. 8 is a table showing results of the selective laser sinter jobs shown in FIG. 7B.

DETAILED DESCRIPTION

Figure 1:
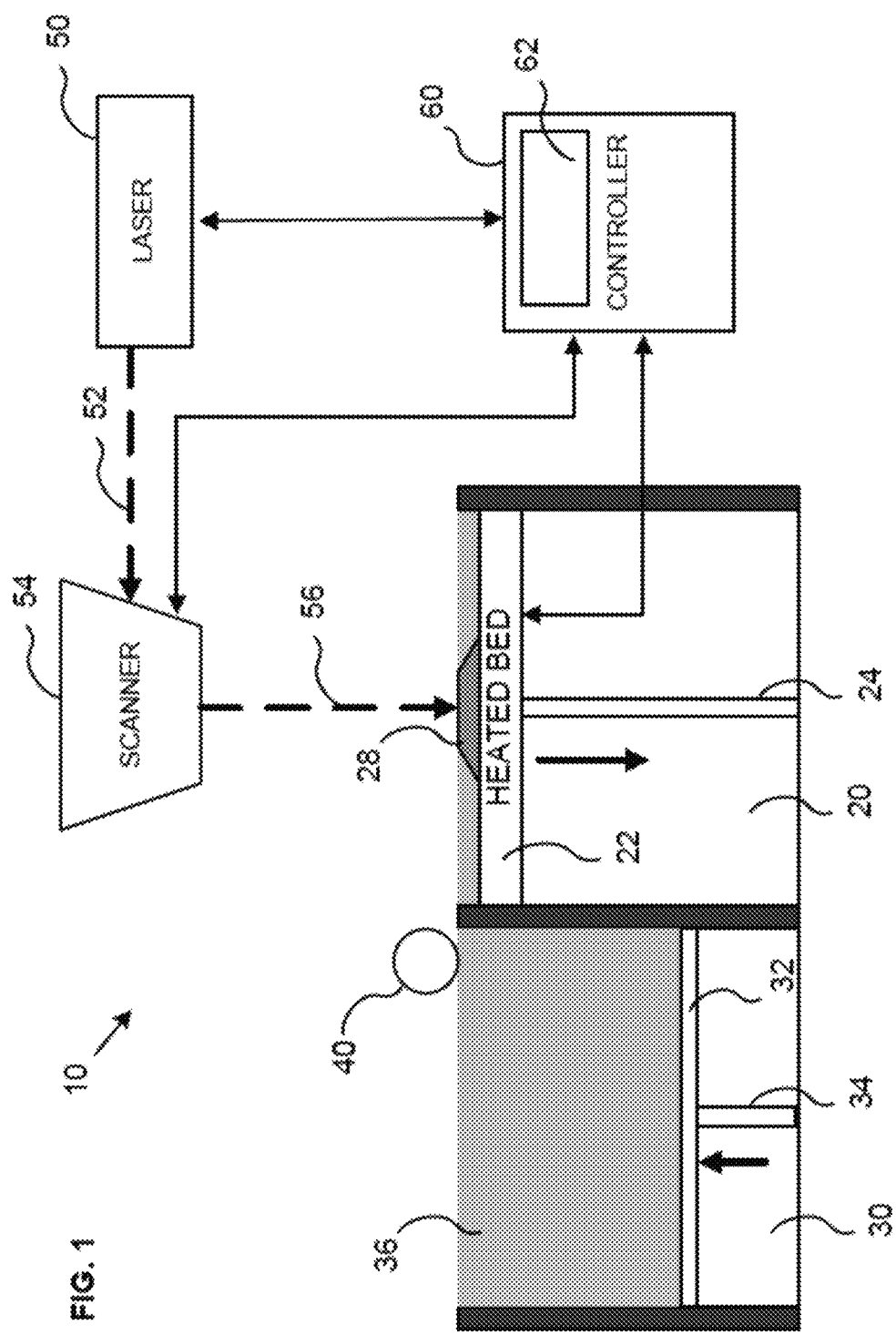
FIG. 1 illustrates a LS machine in accordance with one embodiment of the present invention.

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

The present invention is especially useful for preparing polymer powders for laser sintering. One such class of polymer powders is Polyaryletherketones ("PAEK") polymers. PAEKs are of interest in the SLS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKE KK").

PEKKs are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518. PEKK polymers differ from the general class of PAEK polymers in that they often include, as repeating units, two different isomeric forms of ketone-ketone. These repeating units can be represented by the following Formulas I and II:

-A-C(=O)—B—C(=O)—   I

-A-C(=O)-D-C(=O)—   II where A is a p,p'-Ph-O-Ph-group, Ph is a phenylene radical, B is p-phenylene, and D is m-phenylene. The Formula I:Formula II isomer ratio, commonly referred to as the T:I ratio, in the PEKK is selected so as to vary the total crystallinity of the polymer. The T:I ratio is commonly varied from 50:50 to 90:10, and in some embodiments 60:40 to 80:20. A higher T:I ratio such as, 80:20, provides a higher degree of crystallinity as compared to a lower T:I ratio, such as 60:40.

The crystal structure, polymorphism, and morphology of homopolymers of PEKK have been studied and have been reported in, for example, Cheng, Z. D. et al, "Polymorphism and crystal structure identification in poly(aryl ether ketone)s," Macromol. Chem. Phys. 197, 185-213 (1996), the disclosure of which is hereby incorporated by reference in its entirety. This article studied PEKK homopolymers having all para-phenylene linkages [PEKK(T)], one meta-phenylene linkage [PEKK(I)], or alternating T and I isomers [PEKK(T/I)]. PEKK(T) and PEKK(T/I) show crystalline polymorphism depending upon the crystallization conditions and methods.

In PEKK(T), two crystalline forms, forms I and II, are observed. Form I can be produced when samples are crystallized from melting at low supercooling, while Form II is typically found via solvent-induced crystallization or by cold-crystallization from the glassy state at relatively high supercooling. PEKK(I) possesses only one crystal unit cell which belongs to the same category as the Form I structure in PEKK(T). The c-axis dimension of the unit cell has been determined as three phenylenes having a zig-zag conformation, with the meta-phenylene lying on the backbone plane. PEKK(T/I) shows crystalline forms I and II (as in the case of PEKK(T)) and also shows, under certain conditions, a form III.

Suitable PEKKs are available from several commercial sources under various brand names. For example, polyetherketoneketones are sold under the brand name OXPEKK® polymers by Oxford Performance Materials, South Windsor, Conn. Polyetherketoneketone polymers are also manufactured and supplied by Arkema. In addition to using polymers with a specific T:I ratio, mixtures of polyetherketoneketones may be employed.

The powders used in these applications are produced by a variety of processes such as grinding, air milling, spray drying, freeze-drying, or direct melt processing to fine powders. The heat treatment can be accomplished before or after the powders are produced, but if treated prior to forming the powders, the temperature of the powder forming process must be regulated to not significantly reduce the melting temperature or the quantity of the crystallinity formed in the heat treatment process.

According to one embodiment of the present invention, in reference to FIG. 1, a LS system 10 in accordance with the present invention is illustrated. The system 10 includes a first chamber 20 having an actuatable piston 24 deposed therein. A bed 22 is deposed at an end of the piston 24. It should be understood that the term bed may refer to the physical structure supported on the piston or the uppermost layer of powder deposed thereon.

The temperature of the bed 22 can be variably controlled via a controller 60 in communication with heating elements (not shown) in or around the bed 22. Furthermore, the LS system 10 according to the invention may include a heating device (not shown) above the bed 22, which preheats a newly applied powder layer up to a working temperature below a temperature at which the solidification of the powder material occurs. The heating device may be a radiative heating device (e.g., one or more radiant heaters) which can introduce heat energy into the newly applied powder layer in a large area by emitting electromagnetic radiation.

A second chamber 30 is adjacent to the first chamber 20. The second chamber 30 includes a table surface 32 disposed on an end of a piston 34 deposed therein. A powder 36 for use in the LS system 10 is stored in the second chamber 30 prior to the sintering step. It will be understood to a person of ordinary skill in the art and familiar with this disclosure that while a specific embodiment of a LS system is disclosed, the present invention is not limited thereto, and different known LS systems may be employed in the practice of the present invention.

During operation of the LS system 10, a spreader 40 translates across a top surface of the first chamber 20, evenly distributing a layer of powder 36 across onto either the top surface of the bed 22 or the material previously deposed on the bed 22. The LS system 10 preheats the powder material 36 deposed on the bed 22 to a temperature proximate to a melting point of the powder. Typically, a layer of powder is spread to have a thickness of 125 μm, however the thickness of the layer of powder can be increased or decreased depending on the specific LS process and within the limits of the LS system.

A laser 50 and a scanning device 54 are deposed above the bed 22. The laser 50 transmits a beam 52 to the scanner 54, which then distributes a laser beam 56 across the layer of powder 36 deposed on the bed 22 in accordance with build data. The laser selectively fuses powder material by scanning cross-sections generated from a three-dimensional digital description of the part on the surface of the bed having a layer of the powder material deposed thereon. The laser 50 and the scanner 54 are in communication with the controller 60. After a cross-section is scanned, the bed 22 is lowered by one layer thickness (illustrated by the downward arrow), a new layer of powdered material is deposed on the bed 22 via the spreader 40, and the bed 22 is rescanned by the laser. This process is repeated until a build 28 is completed. During this process, the piston 34 in the second chamber is incrementally raised (illustrated by the upward arrow) to ensure that there is a sufficient supply of powder 36.

In the method of preparing the powders in accordance with the present invention, a raw PEKK flake is provided. The raw PEKK flake is commercially available from companies such as Arkema, Inc. of King of Prussia, Pa., and Cytec Industries Inc. of Woodland Park, N.J. The raw PEKK flake is typically swilled from a chemical reactor and then washed. The raw PEKK flake is a non-powder material. That is, the raw PEKK flake is not in the form of a powder that can be used in the LS. The raw PEKK flake is in the form of irregularly-shaped particles (e.g., particles that are vaguely round, elongated, flat, etc.) and has an appearance similar to that of Rice Krispies® cereal. The irregularly-shaped particles of the raw PEKK flake have grain sizes that are orders of magnitude larger than 150 μm, for example. The remainder of the raw PEKK flake can be in the form of a gel or gel-like form caused by an amount of liquid solvent remaining from the process of producing the raw PEKK.

After the step of providing the raw PEKK flake, a heat treatment step is optionally performed that involves placing the raw PEKK flake into a shallow pan and heating both within a convection oven. The temperature is ramped up to 200° C. over a one-hour period. The temperature is held at 200° C. for several hours (e.g., 5 or 6 hours). The temperature is ramped up a second time to 225° C. The temperature is held at 225° C. for a minimum of one hour and for preferably between one and four hours. The temperature is then ramped up a third time to 250° C. The temperature is held at 250° C. for a minimum of one hour and for preferably between one and four hours. The heat treatment step evaporates any remaining liquid solvent and causes at least substantially all of the raw PEKK to be in the form of irregularly-shaped particles. The heat treatment step also causes some coalescence of the irregularly-shaped particles. However, the bulk density of the raw PEKK remains low after the heat treatment step.

After the heat-treating step, a cooling step is performed that involves powering-off the convection oven and allowing the raw PEKK to cool naturally.

The heat-treatment process is the subject of U.S. patent application Ser. No. 15/872,478 filed on Jan. 16, 2018 by Hexcel Corporation and titled "Polymer Powder and Method of Using the Same." The disclosure of that reference is hereby incorporated by reference.

After the cooling step, a grinding or milling step is performed that involves grinding the raw PEKK flake to form what will hereinafter be referred to as the "PEKK powder." The grinding step can be performed using known grinding techniques performed by companies such as Aveka, Inc. of Woodbury, Minn. Upon completion of the grinding step, the particles of the PEKK powder are significantly smaller (i.e., several degrees of magnitude smaller) than the particles of the raw PEKK. The particles of the PEKK powder are more consistent and regular in shape as compared to the particles of the raw PEKK; however, the particles of the PEKK powder are still irregularly-shaped in comparison to the spherical-shaped particles.

A person of ordinary skill in the art and familiar with this disclosure will understand that the grinding may also be referred to as pulverization, milling, or jet milling. In addition, a person of ordinary skill in the art and familiar with this disclosure will understand that it may also be employed with other polymer powders, including those in the PAEK family.

Figure 2A:
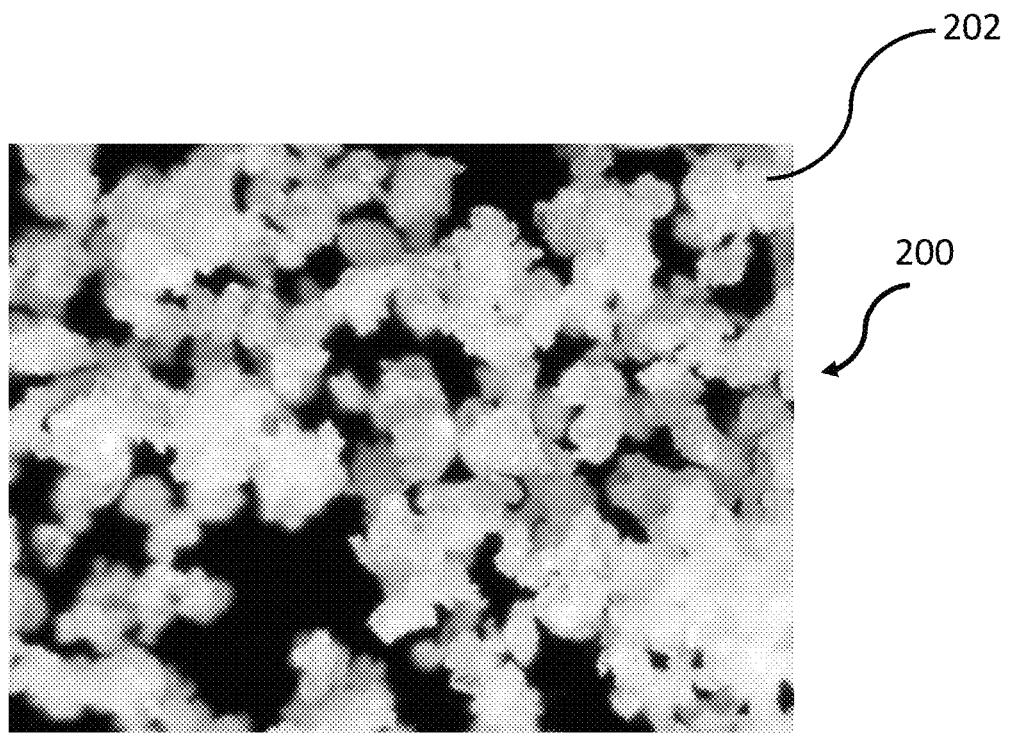
FIG. 2A is an image showing a magnified view of a plurality of PEKK particles.

FIG. 2A is an image 200 showing magnified PEKK particles 202 after the grinding process. These particles were ground from PEKK flake via jet milling. For example, Aveka CCE Technologies based in Cottage Grove, Minn., USA provides grinding and classification services. A mill is used that incorporates dense phase micronization using turbulent, free jets in combination with high efficiency centrifugal air classification within a common housing. This provides comminution by high probability of particle-on-particle impact for breakage and a high degree of particle dispersion for separation. The resultant particles are non-spherical and substantially angular. This is a result of the jet milling process that performs particle comminution via particle-on-particle impact. The substantial non-spherical PEKK particles perform better in the LS process. For example, the non-spherical particles are more easily distributed on the bed table for the LS process and the non-spherical particles result in substantially stronger parts, particularly in the out-of-plane axis. The increased performance of non-spherical particles is due in part to the increased ability for larger and smaller particles to pack together enhancing the strength of the laser fusion.

The raw PEKK flake is ground into a PEKK powder comprising a plurality of PEKK particles. The PEKK particles range in size from less than 10 μm to about 200 μm. A person of ordinary skill in the art and familiar with this disclosure will understand that the particle size range will vary based on the type of polymer being milled and the specific parameters of the milling process.

After the grinding, distribution of powder particles can be analyzed based on particle size using a particle size distribution ("PSD"). For example, a PSD by particle volume shows the percentage of a volume of a specific diameter particle range in the powder composition relative to the overall volume of the composition. A PSD by particle count shows the percentage of a particle count of a specific diameter particle range in the powder composition relative to the overall particle count of the composition.

The PSD can be determined using the Coulter counter method (following ISO 13319). The Coulter method of sizing and counting particles is based on measurable changes in electrical impedance produced by nonconductive particles suspended in an electrolyte. A small opening (aperture) between electrodes is the sensing zone through which suspended particles pass. The Coulter method enables the determination of particle distribution by size according to particle volume relative to the overall volume of the sample or to particle count relative to the overall count of particles in the sample. In reference to the PSD and generally in this application, the term particle diameter refers to a greatest dimension of the particle. A person of ordinary skill in the art and familiar with this disclosure will understand that in context of the particle size, the term diameter does not indicate that the particles are spherical, but instead refers to a largest dimension of the particle as determined via the Coulter method. As discussed above, the plurality of PEKK particles are highly angular and substantially non-spherical due to the particle-on-particle contact impacts during the jet milling process.

After the milling, an air classification method may be used to separate fine particles from the milled PEKK powder. It is known in the art that it is necessary to reduce or eliminate particles having a diameter below a cutoff point, for example 30 μm, as it has been found that particles in this range prevent use of the powder in the LS process. For example, International Patent Application WO2014100320 discloses such a method for preparing powders for use in selective laser sintering. It is understood in the art that parts cannot be manufactured in the SLS process from a powder wherein the fine particles have not been sieved from the powder. Such an unsieved powder causes pilling, sticking, and other forms of fouling in the powder application steps of the SLS process, and further results in curling and premature melting that inhibit use of such powders in the SLS process.

Figure 3A:
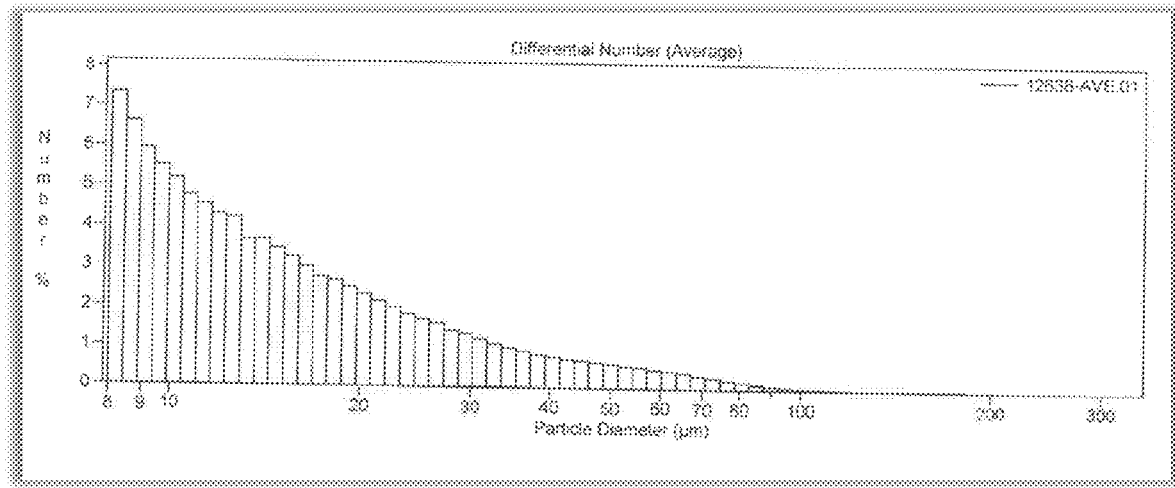
FIG. 3A is a chart showing a particle size distribution ("PSD") by particle count of a PEKK particle feedstock after milling and before separation.
Figure 3B:
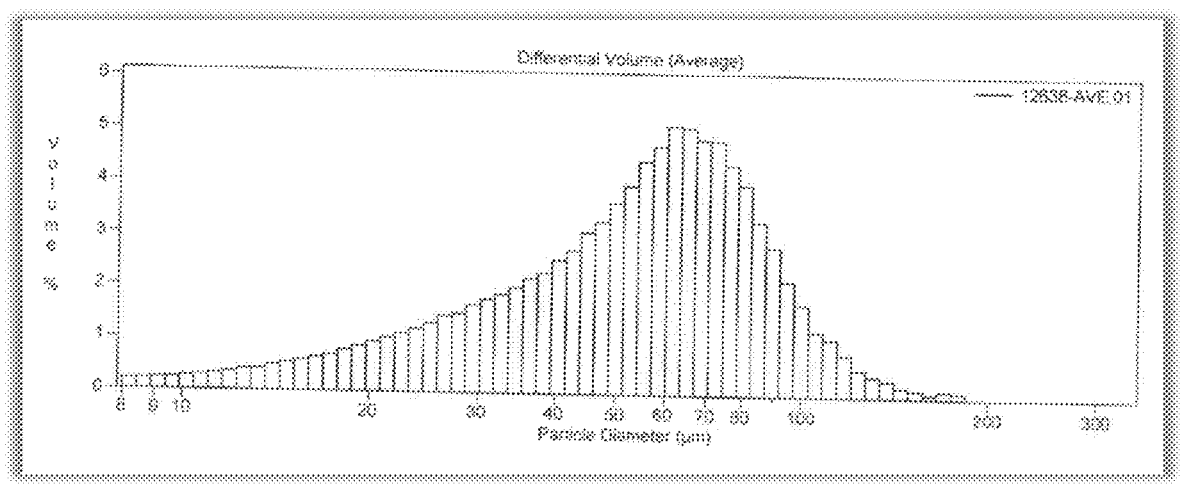
FIG. 3B is a chart showing a PSD by particle volume of a PEKK particle feedstock after milling and before separation.

In reference to FIGS. 3A and 3B two charts 300, 350 show information relating to a plurality of milled PEKK particles prior to removing the fines. Chart 300 shows a PSD by particle count of a milled PEKK powder composition for lot number X69865 prior to separating the fine particles. Chart 350 shows a PSD by particle volume of the milled PEKK powder composition shown in chart 300 prior to separating the fine particles. The PSD by particle count 300, shown in FIG. 3A, shows the relatively large number of fine particles in the PEKK powder composition prior to separation. In reference to chart 300, showing the PSD by particle count, the plurality of particles have a mean diameter of 17.92 μm, a median diameter of 13.19 μm, and a standard deviation of 12.94 μm, each determined based on the particle count. In reference to chart 350, showing the PSD by particle volume, the plurality of particles have a mean diameter of 55.83 μm, a median diameter of 55.96 μm, and a standard deviation of 26.88 μm, each determined based on the volume.

Figure 4A:
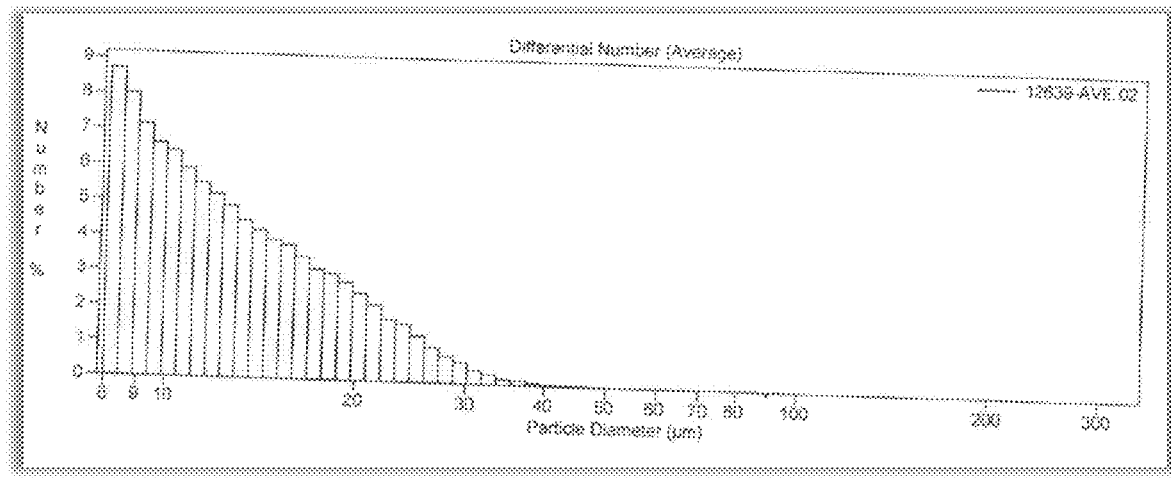
FIG. 4A is a chart showing a PSD by particle count of a plurality of PEKK fine particles separated from the PEKK feedstock shown in FIGS. 3A and 3B after milling.
Figure 4B:
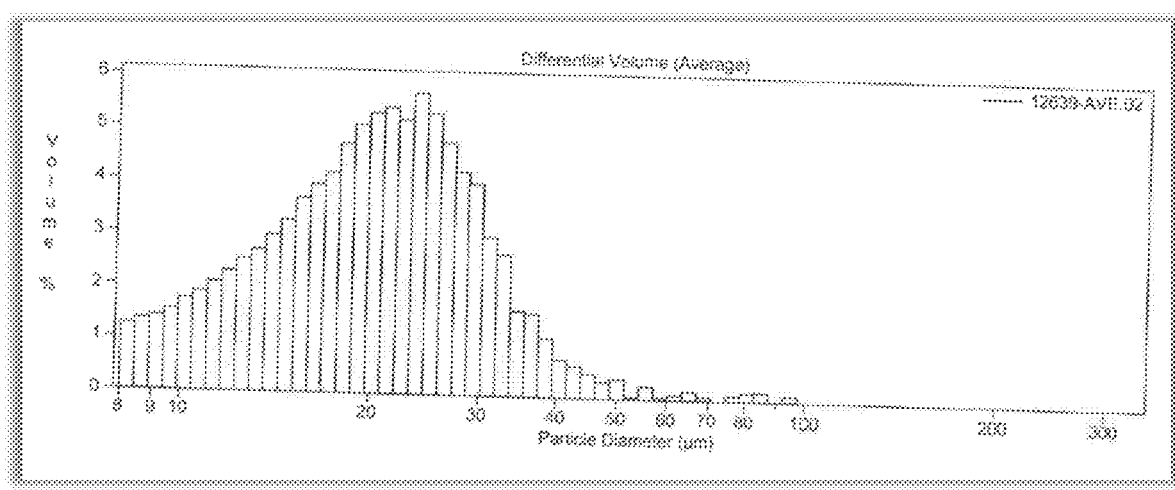
FIG. 4B is a chart showing a PSD by particle volume of a plurality of PEKK fine particles separated from the PEKK feedstock shown in FIGS. 3A and 3B after milling.

In reference to FIGS. 4A and 4B two charts 400, 450 show information relating to a plurality of fine PEKK particles removed from the PEKK powder compositions illustrated in FIGS. 3A and 3B. In this case, a 30 μm cutoff was used to separate the fines from the milled PEKK powder. Chart 400 shows a PSD by particle count of the fines separated from the milled PEKK powder composition for lot number X69865. Chart 450 shows a PSD by particle volume of the fines separated from the PEKK powder composition. In reference to chart 400, showing the PSD by particle count for the removed fines, the plurality of particles have a mean diameter of 13.51 μm, a median diameter of 11.81 μm, and a standard deviation of 5.34 μm, each determined based on the particle count. In reference to chart 450, showing the PSD by particle volume, the plurality of particles have a mean diameter of 21.76 μm, a median diameter of 20.47 μm, and a standard deviation of 9.84 μm, each determined based on the volume. The fines particles removed from the milled particles constitute between 15% and 25% of the milling, and typically average 20%.

Figure 5A:
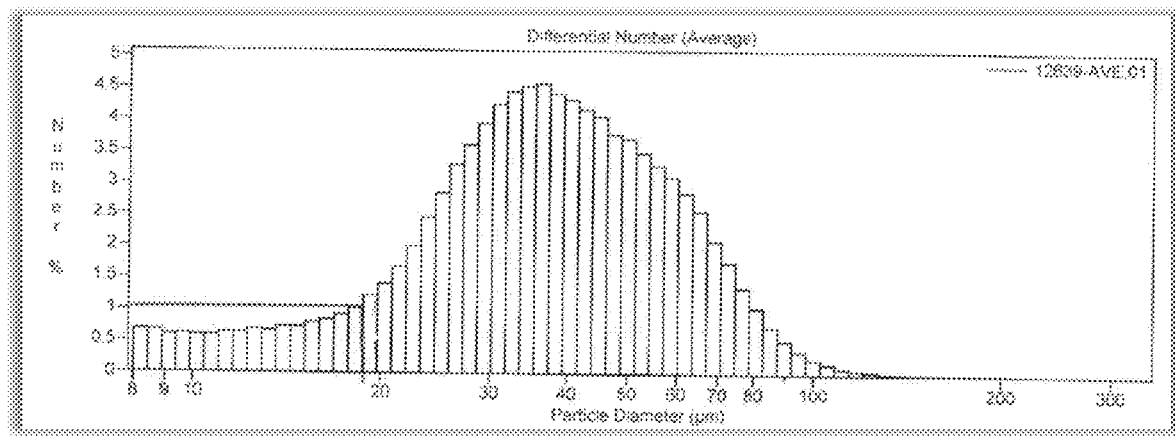
FIG. 5A is a chart showing a PSD by particle count of a plurality of PEKK particles in the PEKK feedstock shown in FIGS. 3A and 3B after the fine particles have been separated.
Figure 5B:
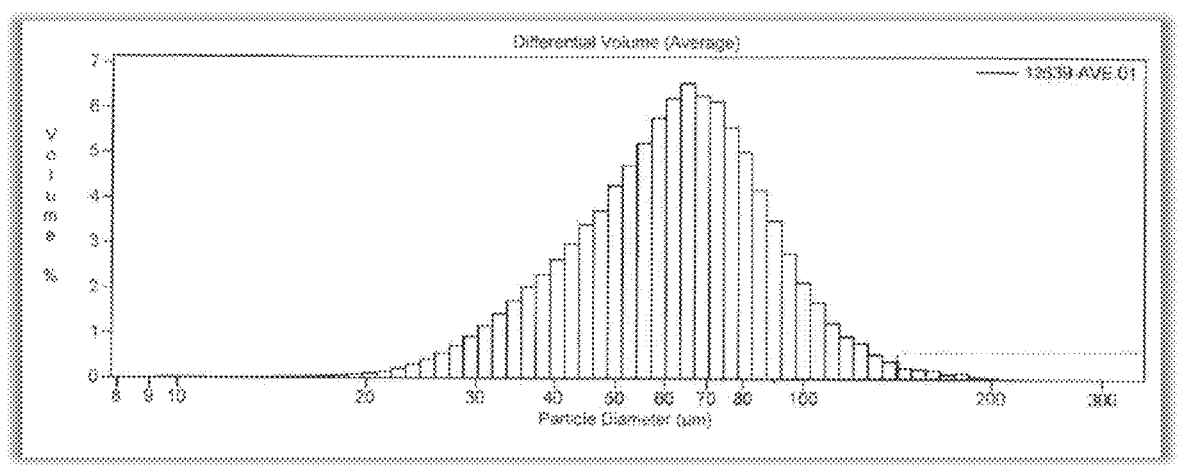
FIG. 5B is a chart showing a PSD by particle volume of a plurality of PEKK particles in the PEKK feedstock shown in FIGS. 3A and 3B after the fine particles have been separated.

In reference to FIGS. 5A and 5B two charts 500, 550 show information relating to a plurality of the PEKK powder compositions illustrated in FIGS. 3A and 3B after the fines, shown in FIGS. 4A and 4B, have been removed. As indicated above, a 30 μm cutoff was used to separate the fines from the PEKK powder. Chart 500 shows a PSD by particle count of the PEKK powder composition after the fines are separated from the PEKK powder composition for lot number X69865. Chart 550 shows a PSD by particle volume of the PEKK powder composition after the fines have been separated. In reference to chart 500, showing the PSD by particle count after removal of the fines, the plurality of particles have a mean diameter of 39.57 μm, a median diameter of 36.65 μm, and a standard deviation of 18.67 μm, each determined based on the particle count. In reference to chart 550, showing the PSD by particle volume, the plurality of particles have a mean diameter of 65.16 μm, a median diameter of 62.85 μm, and a standard deviation of 23.70 μm, each determined based on the volume.

After the grinding and separation steps, a mixing step is performed to assemble the powder composition for laser sintering. The inventors have discovered that they can overcome the disadvantages associated with performing SLS on feedstocks with fine particles if they separate the fine particles from the feedstock and subsequently reincorporate them into the feedstock using a mixer at or around the time that carbon fiber is also introduced into the powder composition. The inventors have unexpectedly discovered that parts made via the SLS process from such improved powders include superior tensile properties in both the x and the z direction as compared to parts made using SLS from ESD without fines and that such parts made from the improved powders include improved smoothness in both upskin and downskin surfaces as compared to similar parts made from ESD powder without fines. In addition, the SLS process using the powder in accordance with the present invention is up to 33% more cost efficient because the previously discarded PEKK fines powder can now be used in the SLS process.

In some embodiments of the present invention, three fractions are mixed together to form the powder composition for selective laser sinter, which may be referred to ESD+ fines. ESD refers to a standard PEKK powder composition offered by Hexcel with 85% PEKK powder and 15% carbon fiber by weight. Fine particles have been removed from the ESD powder. Therefore, it may also be referred to as ESD+no fines. ESD+fines refers to the above described ESD powder in which fines have been removed from the milled powder and then reintroduced.

In some embodiments, the powder compositions comprises three fractions that include a first fraction, a second fraction, and a third fraction. The first fraction comprises a plurality of fine PEKK particles. The second fraction comprises a plurality of PEKK particles from which the fines have been previously removed. The third fraction comprises a plurality of carbon fibers. The first and second fraction may be from the same lot of powder that was milled or may be different lots of powder.

The percentage by weight of the first fraction to the overall powder composition can vary between 5% and 25% or greater. In some embodiments, the first fraction of fines typically constitutes between 10% and 20% of the powder composition by weight. The examples shown below indicate that a first fraction of 10% by weight may yield optimal strength and building conditions under the conditions set forth in those examples. In one embodiment of the present invention, the plurality of particles of the first fraction having a mean diameter as determined by particle count less than 30 microns. In another embodiment of the present invention, the plurality of particles of the first fraction have a mean diameter as determined by particle count between 10 µm to 20 µm.

In some embodiments, the percentage by weight of the second fraction to the overall powder composition can vary between 55% and 85% or greater. In other embodiments of the present invention, the non-fines constitute between 65% and 75% of the powder composition by weight. In one embodiment of the present invention, the plurality of particles of the second fraction has a mean diameter as determined by particle count greater than 30 microns. In another embodiment of the present invention, the plurality of particles of the first fraction have a mean diameter as determined by particle count between 10 µm to 20 µm.

The third fraction combined during the mixing process includes an amount of carbon fiber. The addition of the carbon fiber has the effect of reinforcing and/or stiffening the resulting object. In addition, the carbon fiber may serve as an agent to improve the distribution of PEKK particles, including the fine particles, on the surface of the laser sintering bed. They may enhance the flow of the particles and prevent problems associated with fines in some cases. In the embodiments disclosed use of carbon fiber with an average length L50 is greater than the average grain size D50 of the PEKK powder particles. In some embodiments, PEKK powder and carbon fibers can be selected such that D50<L50<D90.

In some embodiments of the present invention, the first fraction, the second fraction, and the third fraction are mixed at the same time to form the powder composition. The carbon fiber and the PEKK powder, including the fines fraction, can be mixed using a heat shear process that involves mixing the three components using high speed, high torque mixing elements (e.g., a Henschel Mixer®). This has the effect of forcibly dispersing fiber clumps. If left intact, these clumps negatively impact both electrical behaviors and mechanics of the mixture. The more commonly used tumbling blenders (e.g., V-type blenders) lack the energy to disperse fibers correctly. It can be advantageous to prepare large batches of the PEKK powder and carbon fiber mixture for the sake of reducing variability in the processes.

In accordance with one embodiment of the present invention carbon fiber available from Hexcel Corporation of Stamford, Conn., USA and sold under the brand name HEXTOW® AS4 is employed. The carbon fiber is a continuous, high strength, high strain, PAN based fiber. In this embodiment, the carbon fiber has a filament diameter of approximately 7.1 µm and is wound on a cardboard tube. It should be understood to a person having ordinary skill in the art that different types and brands of carbon fibers may be employed, and that the present invention is not specifically limited in this regard.

The carbon fiber is milled prior to incorporation into the PEKK powder to achieve the desired carbon fiber length as determined by the average L50. The carbon fiber is milled by a miller such as E&L Enterprises Inc. in Oakdale, Tenn., USA. For example, in one embodiment of the present invention, the mean carbon length, L50, is 77 µm. The minimum length measured is 38.15 µm, the maximum length measured is 453 µm, and the standard deviation is 42.09 µm. In one embodiment, the milled carbon fiber included in the powder has a mean length L50 is greater than the mean diameter of the plurality of particles D50. In some embodiments, the L50 is greater than 70 µm. In some embodiments of the present invention, the L50 of the carbon fiber is between 70 µm and 90 µm. In yet other embodiments of the present invention, the average fiber length L50 is between 70 µm and 80 µm.

A powder composition suitable for use in a selective laser sintering for printing a three-dimensional object is prepared combining a PEKK powder with the carbon fiber. In some embodiments of the present invention the composition includes 85% by weight of PEKK powder and 15% by weight carbon fiber. It yet other embodiments of the present invention, the amount of carbon fiber is varied relative to the polymer powder to achieve composition for SLS. In some embodiments of the present invention, one or more additives are added to the matrix to affect the properties of the SLS composition, for example, during the printing process or in the printed article. It will be understood to a person of ordinary skill in the art and familiar with this invention, that the ratio of carbon to polymer may vary and the above examples are provided for illustration purposes. The polyaryletherketone (PAEK) powder has a plurality of particles having a mean grain size D50. A plurality of carbon fibers have a mean length L50. L50 is greater than D50.

The plurality of carbon fibers and the plurality of PEKK particles, including the fines and non-fines fractions, are mixed in a high intensity mixer. This may include the Henschel FM 200 high intensity mixer offered by Zeppelin. In the process of high intensity mixing the carbon fibers and PEKK particles are accelerated at high speeds causing collisions between the fibers and the particles thereby embedding the fibers into the PEKK particles. For example, a composition in accordance with the present invention was prepared using a high energy mixer (Zeppelin FM-200) that ran 7 minutes per batch (maximum 100 lbs. fit in the mixer) and the slowest speed is 600 RPM. It has been discovered that embedding the carbon fiber into the particles via the high intensity mixing method results in a portion of the fiber in the particle and a portion of the fiber outside the particle. This configuration has been shown to significantly increase the mechanical properties of parts made from the composition powder using the LS method.

Figure 2B:
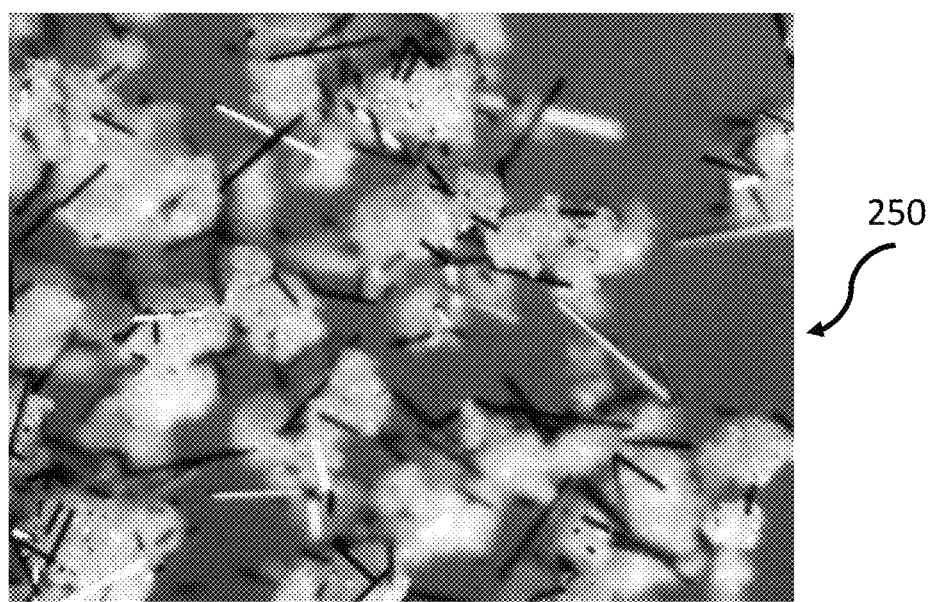
FIG. 2B is an image showing a magnified view of a plurality of PEKK particles and a plurality of carbon fibers.

In reference to FIG. 2B an image showing magnified views of a plurality of PEKK particles and a plurality of carbon fibers after completion of the high energy mixing. As shown in the image, at least a portion of the plurality of the carbon fibers are at least partially embedded in the plurality of particles of the PAEK powder and a least a portion of the carbon fiber is protruding therefrom.

By using the fines in the process, it is possible to increase the yield of powder composition from the raw PEKK flake. As discussed in further detail below, the addition of the fines increases the strength of the parts, and reduces surface roughness, among other benefits. In some embodiments of the present invention it may be possible to omit the separation step. In such cases, the fines are not separated and the carbon is blended with the powder composition that already includes the fines. This method was also tested, as discussed below, resulting in one powder lot that was useable in the SLS process and a second powder lot that was unusable in the SLS process. It has been observed that this may be due to the fact that the separation process results in more uniform blend of fines and non-fines thereby providing a more consistent powder composition product that is more susceptible to predictable sintering.

EXAMPLES

In reference to FIGS. 6, 7A, 7B, and 8, tables are provided with qualification data of powder compositions prepared in accordance with the present invention and parts made therefrom via the selective laser sinter process. In reference to FIGS. 9A, 9B and 10 data is shown that illustrates than unexpected increased tensile strength and unexpected improved surface finish in parts made via SLS from the inventive powder composition as compared to parts made from an ESD powder without fines.

Figure 7A:
FIG. 7A is a table showing additional information and properties regarding the powder compositions referenced in FIG. 6.

In reference to table 700 in FIG. 7A a plurality of powder compositions are identified by unique lot numbers in the column identified with the header "Lot #." Each of the powder compositions comprises a first fraction of fines PEKK powder, a second fraction of non-fines PEKK powder, and a third fraction of carbon fiber. The raw PEKK flake had a T:I ratio of 60:40 and was supplied by either Arkema, Inc. of King of Prussia, Pa., or Cytec Industries Inc. of Woodland Park, N.J., as is shown in the column in table 700 identified with the head "Supplier."

In each qualification example, the raw PEKK flake was subject to a heat treatment step to remove impurities from the PEKK flake. As described above, the temperature was ramped up to 200° C. over a one-hour period. The temperature was then held at 200° C. for about six hours. The temperature was then ramped up a second time to 225° C. The temperature was then held at 225° C. for a minimum of one hour. The temperature was then ramped up a third time to 250° C. and held for at least one hour.

After heat treatment, each of the PEKK flake lots was milled by jet milling resulting in a plurality of particles ranging in size from less than 10 μm to about 200 μm. The milling process was performed using 3000 lbs. lots of PEKK flake. After milling air classification was used to separate fine particles from the milled lots. The classification was set to remove particles having a diameter of 30 μm or less from each lot. This is referred to as fines material, whereas the remainder of the milled lot may be referred to a non-fines material. The removed fines material was about 20% of the total mass of the milled PEKK flake.

Each of the lots shown in table 700 were mixed in a Zeppelin FM-200 mixer that ran 7 minutes per batch (maximum 100 lbs. fit in the mixer) and the slowest speed is 600 RPM. In each lot a first fraction of fines powder was added, a second fraction of non-fines powder was added, and a third fraction of carbon fiber was added. In each of the examples, the carbon fiber was 15% by weight of the resultant powder composition. The percentage of fines was varied in each case. In reference to table 700 in FIG. 7A, the column identified with the header "% Fines (total PEKK)" identifies the percentage of fines PEKK material relative to the overall amount of PEKK material by mass. For example, in reference to the Lot X5470S-6013M, the percentage of fines relative to the overall amount of PEKK in the composition was 22.3%. Thus, if there was 100 lbs. of lot X5470S-6013M, it would include 15 lbs. of carbon fiber and 85 lbs. of PEKK powder material, of which 16.72 lbs. was fines PEKK powder, or 22.3% of 85 lbs. In the tested powder compositions, the percentage of fines reintroduced into the sieved ESD power varied between 24% of the overall PEKK in the mixture to 10% of the overall PEKK in the mixture.

In each of the qualification examples, the fines had a mean size of less than 30 μm, and more specifically a mean size between 10 μm and 20 μm determined from the PSD based on the particle count. The non-fines had a mean size greater than 30 μm and more specifically a mean size between 40 μm and 70 μm.

In further reference to table 700 shown in FIG. 7A, the supplier of the PEKK flake is identified in the column identified with the header "Supplier." In the examples shown in table 700 the supplier is identified as Arkema or Cytec. The condition of the blended powder is also identified, namely virgin or recycled, in the column identified with the head "Condition." Type I refers to virgin powder or powder that has never been subject to a SLS process, and Type II refers to Cake A or powder that has been used in one previous SLS process. The column identified with the header "Compound/Blend" identifies a reference number associated with the blending of the first fraction, second fraction, and third fraction to obtain the powder composition for the SLS process. The column identified with the header "Build Job #" identifies a selective laser sinter print job for each Lot # of powder. In the examples, some of the powder compositions were tested in two or more separate builds hence there are two or more build job numbers associated with each lot and identified in Table 700. The column identified with the header P800 identifies the EOS P800 selective laser sinter machine on which the print job was performed. In the cases of multiple print jobs for a lot of powder, multiple corresponding machines are identified.

In further reference to Table 700 shown in FIG. 7A, the percentage of fines relative to the overall PEKK powder material in the composition is not shown for lots X0000S-6483MA and X0000S-7000MA. In these powder compositions a percentage of fines is not available because the lot comprises recycled PEKK material. Recycled PEKK material has previously been used in an SLS process but not formed into an object. In both cases, the original PEKK that was used to form the recycled material included between 15% and 25% of fines material relative to the overall mass of PEKK material in the powdered composition. This fines material was removed via sieving and reintroduced into the powder composition in accordance with the present invention.

Figure 6:
FIG. 6 is a table showing properties of different powder compositions.

In reference to FIG. 6, table 600 is shown. Table 600 illustrates different properties of the tested lots of PEKK material as determined from the blended powder compositions. DSC analysis was used to determine the properties. The test results for each lot of powder were compared to acceptance criteria, which is shown in the bottom row of table 600. Specifically, the acceptance criteria required a glass transition temperature between 154 and 167 degrees Celsius and an FTIR percentage of match to a standard greater than 95%. As shown in table 600 in FIG. 6, each of the lots of PEKK powder with carbon and fines satisfied the stated criteria.

In further reference to Table 600, the column identified with "Melting Transition Temperature" identifies a melting point for each lot of powder. Two melting points are identified for lots comprising virgin powder because PEKK is a polymorph material that exhibits two melting points. However, after the PEKK material is recycled it typically exhibits a single melting point in DSC analysis. This is shown in reference to the two lots denoted with asterisks in Table 600 as each of these lot comprises PEKK material that has been subject to at least one SLS build.

In order to test the powder compositions in the SLS process an SLS print job was performed using each powder composition to print testing specimens in accordance with ASTM D638. ASTM D638 is a common plastic strength specification and covers the tensile properties of unreinforced and reinforced plastics. The test method uses standard "dumbbell" or "dogbone" shaped specimens that are tested on a tensile testing machine. For each powder composition at least five test specimens were manufactured in the in-plane direction, also referred to as the x-direction, and at least five test specimens were manufactured in the out-of-plane direction or the z-direction. Each of the test specimens were tested pursuant to ASTM D638 and the results for each direction for each powder were averaged. The average results are provided as Table 800 shown in FIG. 8.

Figure 7B:
FIG. 7B is a table showing selective laser sinter parameters of build jobs using the powder compositions referenced in FIG. 6.

For each tested powder composition, the SLS builds were performed in a P800 machine. Table 750 in FIG. 7B shows build parameters. In the row identified with the header "Process Chamber Temperature," the process chamber temperature, also referred to sometimes as the bed temperature, is shown for each build. The process chamber temperature for each powder composition was determined in accordance with an analytical method for determining the bed temperature of an SLS machine. That method is the subject of US patent publication no. US20150061195 by Hexcel Corporation and titled "Method For Analytically Determining SLS Bed Temperatures." The disclosure of that reference is hereby incorporated by reference. Table 750 shows the consistency of process chamber temperature, dosing factors and exposures between each build. Supported by historical practices, it is important to note that Type II (Cake A) material runs at a higher temperature (299) and exposure setting; builds 6574 and 7004 were Type II material.

The laser power, or exposure, for each qualification build is shown in Table 750 in the row identified with exposure. The laser exposure was determined in accordance with an analytical method disclosed in U.S. patent application Ser. No. 15/872,496 filed on Jan. 16, 2018 by Hexcel Corporation and titled "Method for Analytically Determining Laser Power for Laser Sintering." The disclosure of that reference is hereby incorporated by reference. In each case, the exposure number corresponds to a power wattage of the laser wherein an Exposure [ESDCON] of 5 corresponds to 14 Watts, an Exposure [ESDCON] of 6 corresponds to 13.5 Watts, an Exposure [ESDCON] of 7 corresponds to 13.0 Watts, an Exposure [ESDCON] of 8 corresponds to 12.5 Watts, an Exposure [ESDCON] of 9 corresponds to 12.0 Watts, an Exposure [ESDCON] of 10 corresponds to 11.5 Watts, an Exposure [ESDCON] of 8 corresponds to 12.5 Watts and an Exposure [ESDCON] of 20 corresponds to 6.5 Watts.

In FIG. 8, a table 800 showing performance properties for the qualification builds is provided with reference to job number. FIG. 8 also includes acceptance criteria determined from applicant's test library using ESD powder from which the fines have been separated. FIG. 8 also includes the averages of all ESD+fines powdered tested in the study and historical data of Hexcel's ESD powder without fines. Table 800 includes the following information for each tested powder composition: Glass Transition Temperature (Tg), FTIR % Match, Specific Gravity, Average Tensile Stress at Break (X, Z), Average Elongation (X, Z) and Average, Young's Modulus of Elasticity (X, Z). The average tensile strength, elongation and Young's Modulus of Elasticity were determined using the aforementioned ASTM D638 protocol. It is important to note that Type II (Cake A) (6574, 7004) should show higher mechanical performance characteristics due to the fact that recycled PEKK powder is known to result in stronger parts.

The third row from the bottom shows the average fines data of the ESD fines lots tested. This omits job numbers 6574 and 7004 to ensure an accurate comparison as those lots comprise recycled powder. The second row from the bottom is identified with the header Non-Fines Average. This information is historical data collected by Hexcel Corporation between 2016 and 2017 for its commercial production of SLS built products using the P800 machines using a powder composition consisting essentially of 85% PEKK powder from which fines having a size less than 30 µm have been removed and 15% carbon fiber. The powder compositions do not include recycled material. The test parts in the non-fines powder were built in accordance with the same analytical techniques used in construction of the fines qualification pieces using the same group of P800 sintering machines.

The qualification builds with the fines plus powder consistently satisfied the acceptance criteria. The Applicant was unexpectedly able to use the PEKK powder composition with fines to repeatedly build parts using the SLS process that satisfied its rigid acceptance criteria. When comparing the fines-plus data against non-fines, it is also observed the fines plus material results in parts that were unexpectedly stronger as demonstrated by the tensile tests and unexpectedly smooth. The fact that the fines could be used in a PEKK composition in SLS is also unexpected because it was previously understood and previously demonstrated by Applicant that fines powder could not be used in the SLS process to print parts. Therefore, the present invention results in a significant cost savings over the prior art. There is a potential to increase the yield of raw flake by 30% and reduce the cost of raw material in a commensurate amount. The fines powder in accordance with the present invention results in SLS parts that maintains mechanical properties; tensile modulus, strength, and elongation show adequate results with the addition of fines. The data shows an unexpected increase in tensile strength in both X and Z directions. Data showing there is no effect on modulus in X or Z. Data shows there is no effect on elongation as well.

As stated above, the test results indicate an increase of tensile strength in the x-direction and the z-direction. In reference to FIG. 9B, a chart 950 showing a summary of the tensile results in the x-direction is shown comparing tensile results for non-fines with carbon fiber powder composition 920 to fines with carbon fiber powder 910 composition based on the above described test results. Parts made from the powder composition including fines showed a 7.5% increase in strength relative to the traditional or non-fines powder composition. The fines composition also showed a 27.0% reduction in the standard deviation among tested parts. In reference to FIG. 10, a chart showing a summary of the tensile results in the z-direction is shown comparing tensile results for non-fines with carbon fiber powder composition 1020 to fines with carbon fiber powder composition 1010 based on the above described test results. Parts made from the powder composition including fines showed in 10.9% increase in strength relative to the traditional or non-fines powder composition. The fines composition also showed a 19.2% reduction in the standard deviation among tested parts.

Figures 9A, 9B:
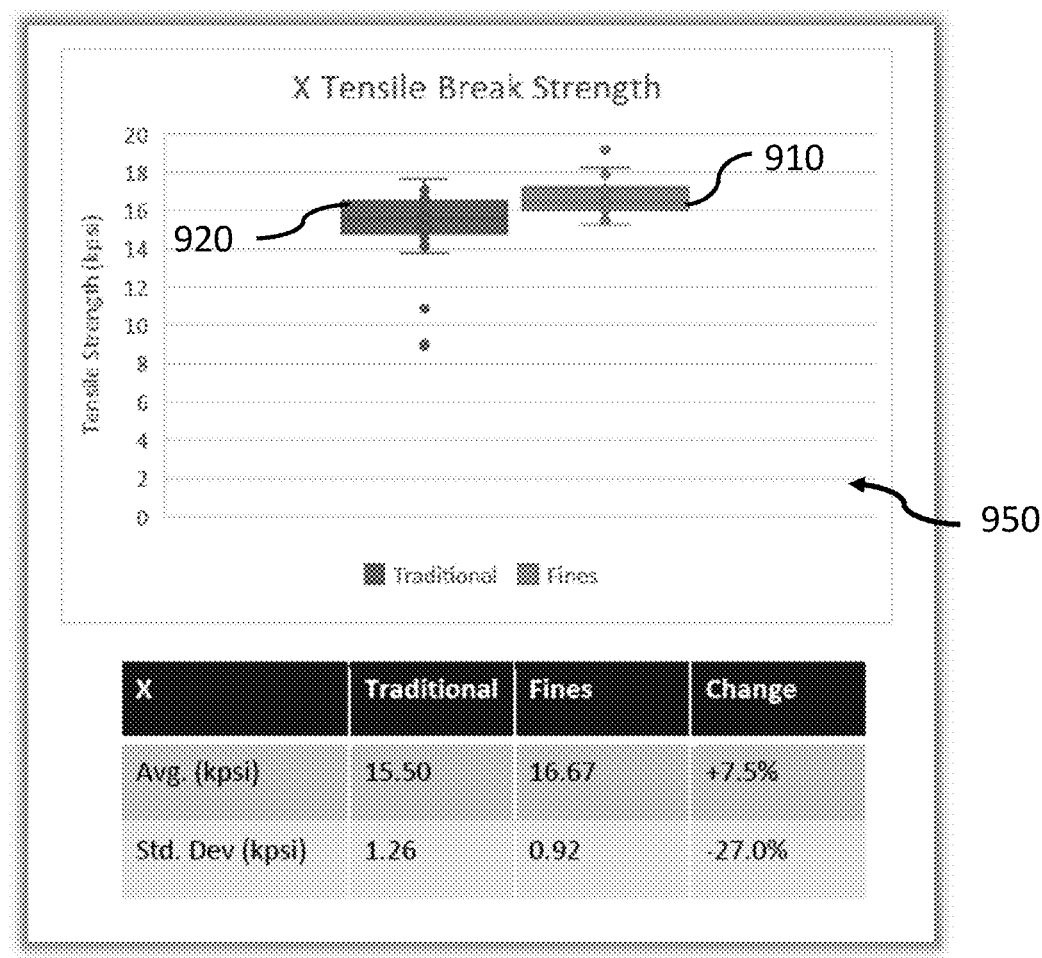
FIG. 9A is a chart showing the tensile properties of parts made via SLS from PEKK powder lots using different amounts of fines.
FIG. 9B is a chart comparing the tensile properties in the x-plane of the test parts made in the selective laser sinter jobs from a PEKK powder from which fines have been removed (Traditional) and from a PEKK powder in which fines have been reintroduced in accordance with the present invention (Fines).
Figure 10:
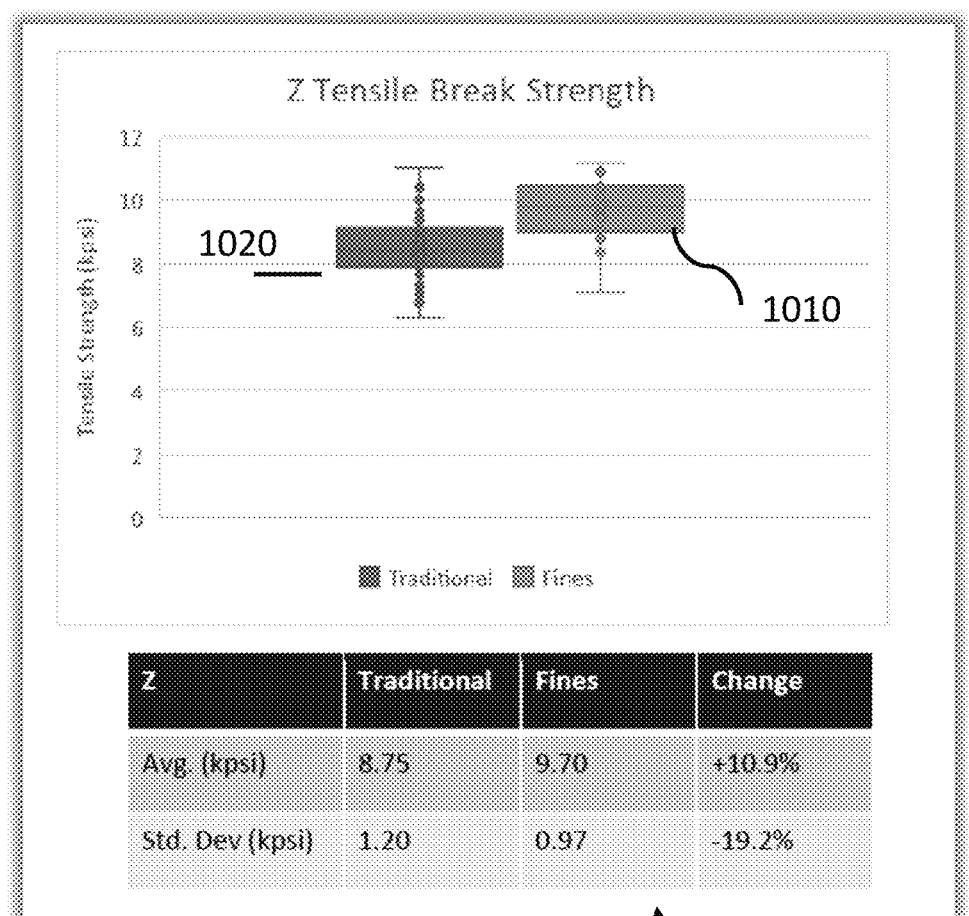
FIG. 10 is a chart comparing the tensile properties in the z-plane of the test parts made in the selective laser sinter jobs from a PEKK powder from which fines have been removed (Traditional) and from a PEKK powder in which fines have been reintroduced in accordance with the present invention (Fines).

In reference to FIG. 9A, table 900 showing the average tensile properties of powder compositions in accordance with the present invention having 20% fines, 15% fines, and 10% fines reintroduced into the milled particle as determined by the overall PEKK in the composition. The chart also shows average historical data for PEKK ESD powder excluding the fines (0%). The test results are for powder provided from a single supplier. The tensile test results on the built parts show for powder from this supplier that reintroducing 10% of fines powder by weight of the total PEKK results in the strongest average part as measured in the Z-direction. Reintroduction of 15% fines by weight of the total PEKK results in the second strongest average, and reintroduction of 20% fines by weight of the total PEKK results in the third strongest average. It should be noted that the 20% reintroduction was still stronger than parts made from PEKK powder from which the fines were removed.

Test parts were also constructed during the builds using the powder compositions. The dimensional evaluation of these builds shows that the profile and thickness dimensional values are in-line with current products. The resistivity of the parts was also tested, and it was found that the resistivity is unaffected by the fines and that there is no relationship between added fines and resistivity.

Figure 11A:
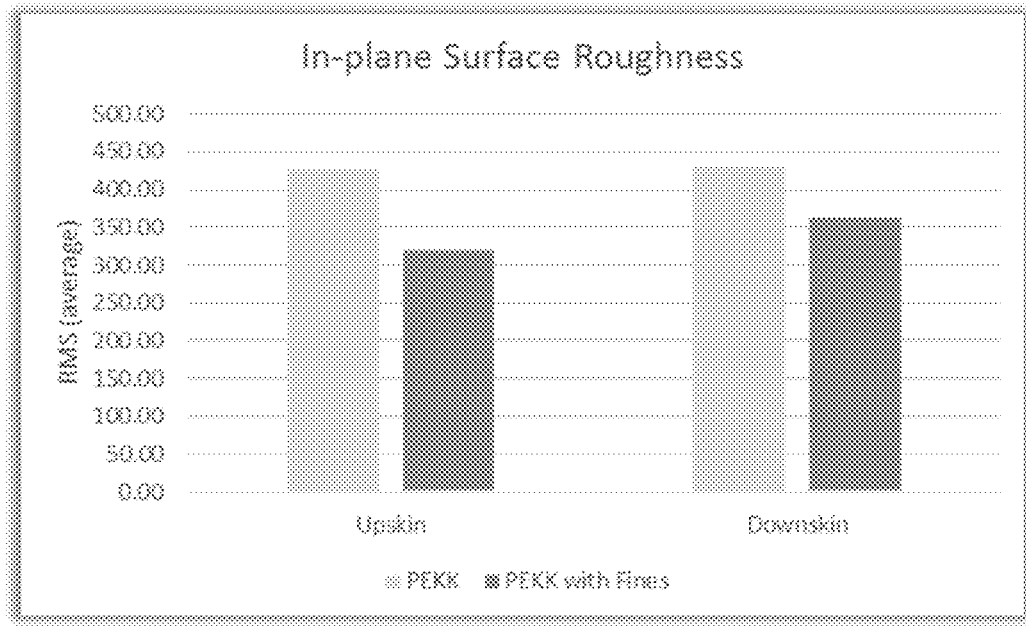
FIG. 11A is a chart comparing in-plane surface roughness of parts made via the SLS process from a PEKK powder from which fines have been removed (Traditional) and from a PEKK powder in which fines have been reintroduced in accordance with the present invention (Fines).
Figure 11B:
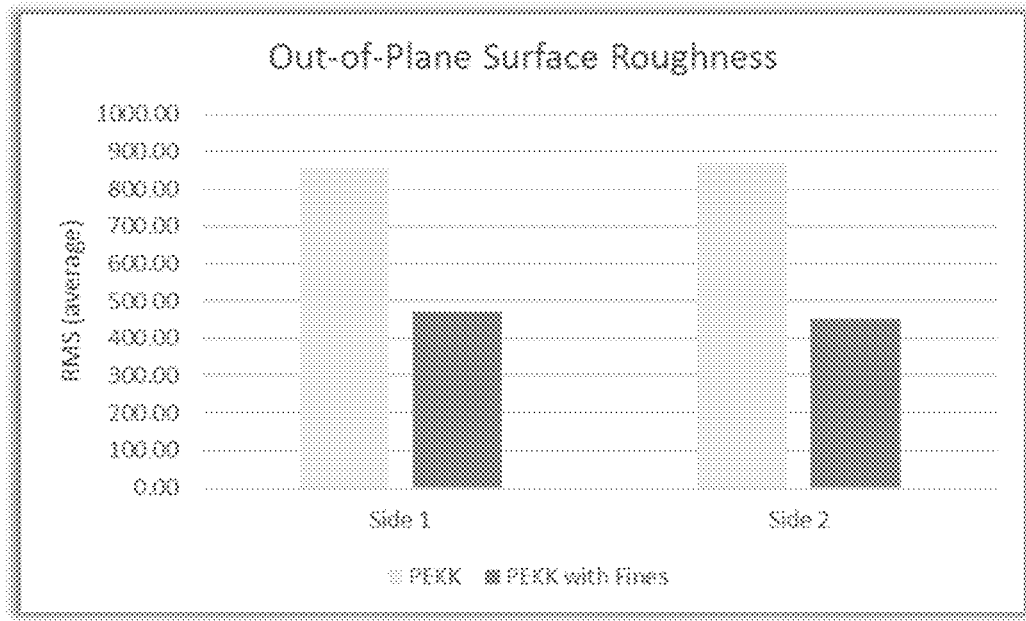
FIG. 11B is a chart comparing out-of-plane surface roughness of parts made via the SLS process from a PEKK powder from which fines have been removed (Traditional) and from a PEKK powder in which fines have been reintroduced in accordance with the present invention (Fines).

In reference to FIGS. 11A and 11B, the average surface roughness of the qualification samples is shown and compared to the average surface roughness of the non-fines test pieces. The surface roughness is shown as an RMS value and was determined pursuant to ASME B46.1. In reference to chart 1100 in FIG. 11A, the in-plane surface roughness is shown. This refers to the x-plane in the build machine. Both the upskin, or top layer, and downskin, or bottom layer, exhibits a substantial decrease in surface roughness between the PEKK powder composition without fines and the powder composition with fines. Likewise, in reference to FIG. 11B, the out-of-plane surface roughness is shown. This refers to parts made along the z-axis in the build machine. Both the first side and the second sides show a decrease in the surface roughness between the PEKK powder composition without fines and the PEKK powder composition with fines.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A powder composition suitable for use in laser sintering for printing a three-dimensional object, the powder composition comprising:
    a first fraction comprising a polyaryletherketone (PAEK) powder having a plurality of particles, the plurality of particles having a mean diameter less than 30 µm;
    a second fraction comprising a PAEK powder having a plurality of particles, the plurality of particles having a mean diameter greater than 30 µm;
    a third fraction comprising a plurality of carbon fibers.

2. The powder composition of claim 1, wherein the first fraction and the second fraction comprise polyetherketoneketone (PEKK) particles.

3. The powder composition of claim 2 wherein the plurality of particles of the first fraction have a mean diameter between 10 µm to 20 µm.

4. The powder composition of claim 3, wherein the third fraction is between 10% and 20% of the composition by weight.

5. The powder composition of claim 4, wherein the first fraction is between 5% and 25% of the composition by weight.

6. The powder composition of claim 3, wherein the third fraction is 15% of the composition by weight.

7. The powder composition of claim 6, wherein the first fraction is 17% or less of the composition by weight.

8. The powder composition of claim 4, wherein the PEKK particles are substantially non-spherical.

9. The powder composition of claim 8, wherein a mean length of the plurality of carbon fibers is greater than a mean diameter of the plurality of particles of the powder composition.

10. The powder composition of 7 wherein the first fraction is 15% or less of the composition of by weight.

11. The powder composition of claim 10, wherein the first fraction is 12.5% or less of the composition by weight.

12. The powder composition of claim 11, wherein the first fraction is about 8.5% of the composition by weight.

13. A three dimensional object obtained from a polyaryletherketone (PAEK) powder by selective laser sintering by applying a layer of the powder on a bed of a laser sintering machine, solidifying selected points of the applied layer of powder by irradiation, successively repeating the step of applying the powder and the step of solidifying the applied layer of powder until all cross sections of the three-dimensional object are solidified, wherein the powder has the following structural characteristics:
    a first fraction separated from a polyaryletherketone (PAEK) feedstock, the first fraction comprising a plurality of particles having a mean diameter less than 30 µm;
    a second fraction separated from the PAEK feedstock, the second fraction comprising a plurality of particles having a mean diameter greater than 30µ;
    a second fraction comprising a PAEK powder having a plurality of particles, the plurality of particles having a mean diameter greater than 30 µm;
    a third fraction comprising a plurality of carbon fibers;
    wherein the first fraction, the second fraction, and the third fraction are blended to obtain the powder.

14. The three dimensional object according to claim 13, wherein PAEK powder comprises polyetherketoneketone (PEKK).

15. The three dimensional object according to claim 13, wherein the plurality of particles of the first fraction have a mean diameter between 10 µm to 20 µm.

16. The three dimensional object according to claim 15, wherein the third fraction is between 10% and 20% of the composition by weight of the blended powder.

17. The three dimensional object according to claim 16, wherein the first fraction is between 10% and 25% of the composition by weight of the blended powder.

18. The three dimensional object according to claim 17, wherein the third fraction is 15% of the composition by weight.

19. The three dimensional object according to claim 16, wherein the first fraction is 17% or less of the of the composition by weight of the blended powder.

20. The three dimensional object according to claim 14, wherein the PEKK particles being substantially non-spherical.

21. The three dimensional object according to claim 20, the first fraction, the second fraction, and the third fraction are blended in a high intensity mixer.

22. The three dimensional object according to claim 21 wherein blending comprises operating the high intensity mixer at a speed of greater than 500 rpm for at least one minute.

23. The three dimensional object according to claim 21 wherein the PAEK feedstock is subject to a heat treatment before the separation.

24. The three dimensional object according to claim 19, the first fraction is 15% or less of the composition of by weight.

25. The three dimensional object according to claim 24, wherein the first fraction is 12.5% or less of the composition by weight.

26. The three dimensional object according to claim 25, wherein the first fraction is about 8.5% of the composition by weight.

* * * * *